United States Patent [19]

Arendt et al.

[11] Patent Number: 5,076,663

[45] Date of Patent: Dec. 31, 1991

[54] CORROSION PROTECTION FOR SILVER REFLECTORS

[75] Inventors: Paul N. Arendt; Marion L. Scott, both of Los Alamos, N. Mex.

[73] Assignee: The United States of America as represented by the United States Department of Energy, Washington, D.C.

[21] Appl. No.: 417,148

[22] Filed: Oct. 4, 1989

[51] Int. Cl.$^5$ .................................................. G02B 1/00
[52] U.S. Cl. .................................... 359/884; 359/589; 359/350
[58] Field of Search ................ 350/164, 166, 1.1, 642; 372/99

[56] References Cited

U.S. PATENT DOCUMENTS

| | | |
|---|---|---|
| 3,687,713 | 8/1972 | Adams . |
| 4,009,947 | 3/1977 | Nishida et al. ............... 350/28 |
| 4,160,584 | 7/1979 | Giles ................................ 350/164 |
| 4,189,205 | 2/1980 | Vandehei ..................... 350/164 |
| 4,430,366 | 2/1984 | Crawford et al. ............. 427/16 |
| 4,482,209 | 11/1984 | Grewal et al. ................ 350/64 |
| 4,617,192 | 10/1986 | Chin et al. ..................... 427/42 |
| 4,645,714 | 2/1987 | Roche ............................ 350/642 |
| 4,685,110 | 8/1987 | DeBell et al. ................. 372/10 |
| 4,713,824 | 12/1987 | Heller ............................ 372/99 |
| 4,721,632 | 2/1988 | Brown ............................ 427/10 |
| 4,749,255 | 6/1988 | Chakrabarti et al. ........ 350/164 |

OTHER PUBLICATIONS

G. Hass et al., "Reflectance and Durability of Ag Mirrors Coated with Thin Layers of $Al_2O_3$ Plus Reactively Deposited Silicon Oxide", Journal of Applied Optics, vol. 14, No. 11 (1975).

Primary Examiner—Bruce Y. Arnold
Assistant Examiner—Tho Van Tran
Attorney, Agent, or Firm—Richard J. Cordovano; Paul D. Gaetjens; William R. Moser

[57] ABSTRACT

A method of protecting silver reflectors from damage caused by contact with gaseous substances which are often present in the atmosphere and a silver reflector which is so protected. The inventive method comprises at least partially coating a reflector with a metal oxide such as aluminum oxide to a thickness of 15 Å or less.

4 Claims, 4 Drawing Sheets

CORROSION PROTECTION FOR SILVER REFLECTORS

This invention is the result of a contract with the Department of Energy (Contract No. W-7405-ENG6-36).

BACKGROUND OF THE INVENTION

This invention relates to reflection of light and vapor deposition of metals.

Silver is a desirable reflector for telescope mirrors used in high power laser applications and in other applications where very high reflectivity is required. Silver is an excellent reflector in the visible and near infrared regions of the spectrum and has a high threshold of resistance to laser damage and radiation-induced damage.

Silver reacts with trace amounts of sulfur compounds in the atmosphere and a sulfide film quickly forms on the surface of an unprotected silver reflector, causing significant degradation of reflectivity. Reflectivity at glancing angles of incidence, where the incident radiation strikes the mirror at angles other than 90° to the mirror surface, is particularly sensitive to this tarnishing. This has severely limited the use of bare silver. Overcoating of a silver surface with various transparent substances has been used to protect the silver, but reflectivity properties of a silver reflector may be changed by the coating and the laser damage and radiation damage thresholds are usually degraded by the coating.

Aluminum oxide, or alumina, has been used to coat silver reflectors to prevent sulfide corrosion by forming a barrier between the silver and the atmosphere, but such coatings have been much thicker than the coating of the present invention and have not been considered by those working in this area to have solved the problem. These thick coatings contain pinholes and decrease reflectivity. Also, a thick alumina coating deteriorates in the presence of radiation such as neutrons and gramma rays; color centers are created in alumina by the radiation. A color center is a defect in a crystal lattice which is occupied by an electron, where the defect of absorbs light, thereby causing the defect to appear as a color other than white. When exposed to laser light, the color centers absorb the light instead of reflecting it. Also, the laser damage threshold of the coating is degraded by the presence of color centers. When the alumina coating is very thin, as in the present invention, the absorption of light by any color centers which form will be minimal.

Following are brief descriptions of patents and an article which may be of interest.

1. George H. Crawford et al., "Metal/Metal Oxide Coating," U.S. Pat. No. 4,430,366, February 1984. This patent teaches a method of deposition, on a substrate, of a layer or layers of certain metals, oxides, or sulfides of these metals, or a metal and its oxide or sulfide in a continuous and rapid manner. Deposition of layers from molecular dimensions to micrometers is mentioned (column 2, line 65-68) and it is then said that preferably the layer is between 50 and 5000 Å thick when used in imaging applications and between 15 and 25 Å thick when used to cause a layer of another substance to bond to it. This patent contains no mention of use of these coatings for the purpose of corrosion protection.

2. G. W. DeBell et al., "Optical Component of a Laser," U.S. Pat. No. 4,685,110, August 1987. This patent teaches that metal oxides and certain other substances may be used to coat optical elements of a laser apparatus, such as windows, in order to prevent physical and chemical changes induced by the large photon fluxes of the laser. The usual change induced by large photon fluxes is photoreduction; for example, crystalline silicon dioxide may be reduced to elemental silicon. This patent mentions coatings over 50 Å thick, half wave optical thickness (absentee layer), and integral multiples of half wave optical thickness.

3. V. Grewal et al., "Mirror Structure," U.S. Pat. No. 4,482,209, November 1984. This patent teaches a mirror having an adhesive layer which may be titanium or chromium, an intermediate layer which may be aluminum oxide, a reflective layer which may be silver, and a protective layer which may be alumina, where the protective layer will have a thickness of about 300 to 3000 Å.

4. G. Hass et al., "Reflectance and Durability of Ag Mirrors Coated with Thin Layers of $Al_2O_3$ Plus Reactively Deposited Silicon Oxide," Journal of Applied Optics, Vol. 14, No. 11 (1975). This article teaches a combined coating for a silver mirror consisting of a layer of alumina covered by a layer of silicon oxide. It is stated that the optimum thicknesses of the two layers are about 300 Å for the alumina layer and about 1500 Å for the silicon oxide layer.

5. F. I. Brown, "Method of Improving the Conductivity and Lowering the Emissivity of a Doped Tin Oxide Film," U.S Pat. No. 4,721,632, January 1988. This patent is directed to a method of improving the conductivity and lowering the emissivity of a doped tin oxide film on the surface of a soda lime silica glass sheet.

6. A. K. Chin et al., "Process for Making Optical INP Devices," U.S. Pat. No. 4,617,192, October 1986. This patent teaches a process for coating optical surfaces with aluminum oxide using electron-beam deposition in an oxygen enriched atmosphere. The primary purpose of the process is to produce anti-reflecting coatings, though it is stated that the coatings can be used for other purposes. The typical thickness of an alumina coating is 1850 Å.

7. H. N. Adams et al., "Protective Coating for Surfaces of Silver and Mirror Fabrication," U.S. Pat. No. 3,687,713, August 1972. This patent teaches a protective coating for silver and other substances consisting of a layer of aluminum oxide covered with a layer of silicon dioxide. The aluminum oxide layer is deposited to a thickness of about 1000 to 1100 Å.

8. K. Nishida et al., "Reflecting Mirror," U.S. Pat. No. 4,009,947, March 1977. This patent teaches a mirror comprised of a glass substrate, a silver layer, and protective layer consisting of a copper-tin alloy.

SUMMARY OF THE INVENTION

This invention is a method of protecting silver reflectors from damage caused by contact with gaseous substances which are often present in the atmosphere and a silver reflector which is so protected. The inventive method comprises at least partially coating a reflector with a metal oxide such as aluminum oxide to a thickness of 15 Å or less. The coating is much thinner than has been previously used for corrosion protection. It is surprising that the invention is effective, since the metal oxide layer is so thin; it is unlikely that the metal oxide completely covers the silver.

DETAILED DESCRIPTION OF THE INVENTION

Figure 1:
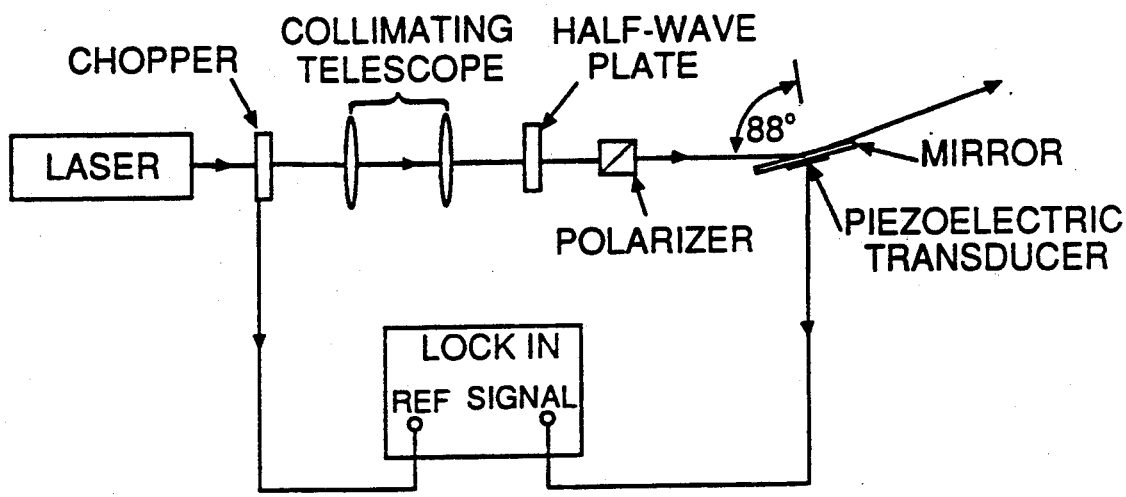
FIG. 1 is a schematic representation of a photoacoustic absorptance measurement system with the test mirror arranged for an 88° angle of incidence. This measurement system was used to obtain the data presented herein.

In the practice of the present invention, alumina or another metal oxide is deposited on a silver reflector by any of the well known methods for applying thin films to surfaces, such as sputtering or electron beam deposition. In this film coating apparatus, a shutter is normally provided between the coated object and the source of coating material for the purpose of controlling deposition time.

The advance in the art provided by this invention is that corrosion protection of silver is provided by a metal oxide overcoating that is so thin that it cannot be covering the silver surface entirely. Though certain aspects of the technology are not understood, it is clear that this invention provides significant corrosion protection in comparison to bare silver. Unlike silver mirrors with thick overcoats of a dielectric material such as alumina, this thin overcoat does not significantly change the reflectivity properties of a mirror. Color centers which form will absorb only a minimal quantity of light as a result of the thin coating. The laser damage threshold of a mirror with the thin coating of this invention is similar to that of a bare silver mirror.

It is believed that the coatings of this invention used in the experimentation described below were about 10 Å thick. The method of determining coating thickness which was used (which is explained below) is believed to be accurate only to about plus or minus 5 Å at this level of thickness. Thus the experimental coating may have varied up to about 15 Å.

The magnitude of the surprising results provided by the thin coating of this invention can be appreciated when it is noted that a 10 Å coating is about 3 molecules thick. Also, it is believed that the coating is non-uniform, since it is necessary to open the shutter of the coating deposition apparatus for only 1 to 2 seconds in order to coat the mirrors tested as described below. However, scanning electron micrographs of coated surfaces were made and there were no distinct features, such as changes of coating material, visible on the surfaces within the lateral resolution of the instrument (approximately 100 nm).

In experimentation performed in connection with this invention, test reflectors were prepared. Substrates of polished silicon (5–10 Å rms roughness), each having a diameter of 5 cm and thickness of 0.6 cm or 1.3 cm, were placed in the vacuum chamber of electron beam coating apparatus. Each substrate was coated with a 10 nm thick chromium adhesion layer and a 190 nm thick layer of silver. A number of the test reflectors were coated with alumina in accordance with this invention and the others were left with a bare silver surface for use as controls. Prior to alumina coating of the test mirrors, oxygen was added to the vacuum chamber to increase the absolute pressure from about $6-7 \times 10^{-7}$ torr to about $10^{-4}$ torr. This was done to ensure that $Al_2O_3$ was deposited rather than an oxygen deficient coating. A shutter located between an alumina source of 99.99% purity and a test reflector was opened for a very brief period (1–2 seconds) in order to expose the test reflector to alumina vapor.

Several test reflectors were subjected to a severe qualitative corrosion test which is believed to be equivalent to some number of years of exposure to the atmosphere. They were exposed to a concentrated ammonia sulfide atmosphere. This caused the unprotected silver to blacken and began to peel away from the chromium coated silicon substrate in about 15 minutes. No change was observed in the test reflectors coated with alumina.

A photoacoustic calorimetry system was used to measure absorptance of the test mirrors. FIG. 1 depicts the absorptive measurement system arranged for glancing incidence of a laser beam. In such a system, energy from a laser beam incident upon a mirror is absorbed at the mirror surface. This absorbed energy generates elastic strain waves which propagate through the mirror substrate. The strain waves pass through a piezoelectric transducer rigidly attached to the back of the mirror substrate. The strain induced in the piezoelectric transducer causes a voltage to be generated by it which is directly proportional to the magnitude of the strain. Thus, the voltage generated is proportional to the amount of energy absorbed at the mirror surface.

Referring to FIG. 1, the output from a cw laser is sent through a chopper, a collimating telescope, a half-wave plate to rotate the laser beam polarization, a clean-up polarizer oriented in the same direction as the half-wave plate to remove any light not rotated by the plate, and then to the mirror under test. The piezoelectric transducer on the back of the mirror detects the strain wave generated by laser energy absorbed by the surface of the mirror. Using a phase-sensitive lock-in amplifier, this system is able to detect the very small laser absorption on the mirror surface that occurs at glancing angles of incidence.

Although extremely sensitive and having a wide linear range, photoacoustic calorimetry provides only a relative measurement. An absolute absorptance calibration of the photoacoustic calorimetry equipment is accomplished by using a laser energy ratiometer to measure the incident and reflected laser light at near normal incidence to the mirror. Such calibration apparatus is shown schematically in FIG. 2.

Figure 2:
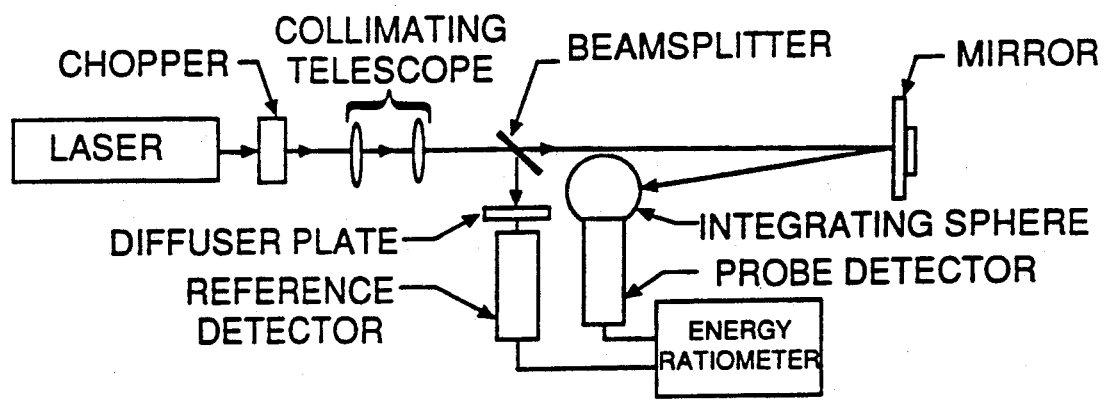
FIG. 2 is a schematic representation of apparatus used to calibrate the measurement system of FIG. 1.

Referring to FIG. 2, a beamsplitter is positioned after the collimating telescope. The reflected beam from the beamsplitter is passed through a diffuser plate to a reference detector and used as a reference to normalize out power fluctuations of the laser. A second detector serves to measure the laser energy transmitted through the beamsplitter and the energy reflected from the test mirror. An integrating sphere attached to the second detector helps reduce sensitivity to alignment position when the detector is moved so that it can be used to measure the both incident and reflected light. Many chopped laser pulses are averaged at each detector position and an average of incident-to-reflected ratios are obtained by moving the detector back and forth several times to measure the incident and reflected laser light. The values of absolute absorptance tend to be slightly higher than those measured by others. This is probably due to incomplete collection by the integrating sphere of all the light reflected by the mirror. However, the trends of the data are valid, including any relative increase in absorptance observed.

Additional information on photoacoustic calorimetry and calibration of equipment used therein may be found in the following publication: W. D. Kimura et al., "Photoacoustic Calorimetry System For Glancing Incidence Mirror Absorptance Measurements," Rev. Sci. Instrum., 57(11), pp. 2754–2762 (1986).

Argon ion laser light having a wavelength of 0.5145 micron and light from a Nd:YAG laser at 1.06 microns wavelength were used in determining absorptance. The absorptance measurement apparatus is more sensitive at 0.5145 micron than when 1.06 micron light is used. The data presented herein were collected at two different angles of incidence of the laser light to the test mirrors: 0° and 88°. The laser light was polarized perpendicular to the plane of incidence (s polarization). FIG. 1 depicts a test mirror arranged such that the angle of incidence is 88°. A 0° angle of incidence is normal to the mirrors. From experiments where the angle of incidence was varied between 0° and 88° it was found that the absorptance of a reflector decreases as the angle becomes more oblique.

Figure 3:
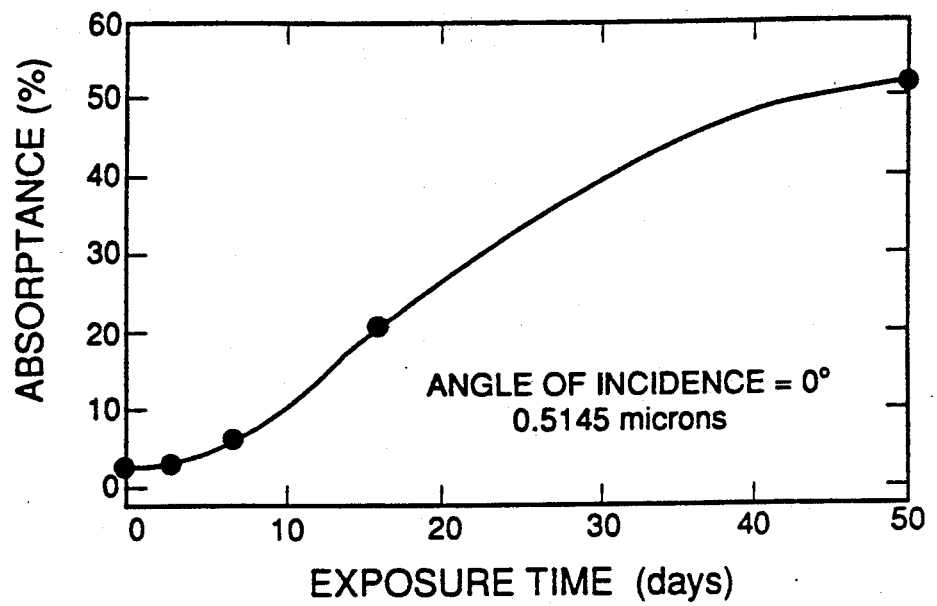
FIG. 3 shows the increase in absorptance of a bare silver reflector upon exposure to the atmosphere.

The absorptance of test mirrors in the untarnished state was measured. In all tests, the mirrors were stored upside down to prevent dust accumulation and held so that nothing was in contact with the mirror. FIG. 3 presents absorptance of a bare silver mirror as a function of days of exposure to room air. The bare silver tarnished greatly.

Figure 4:
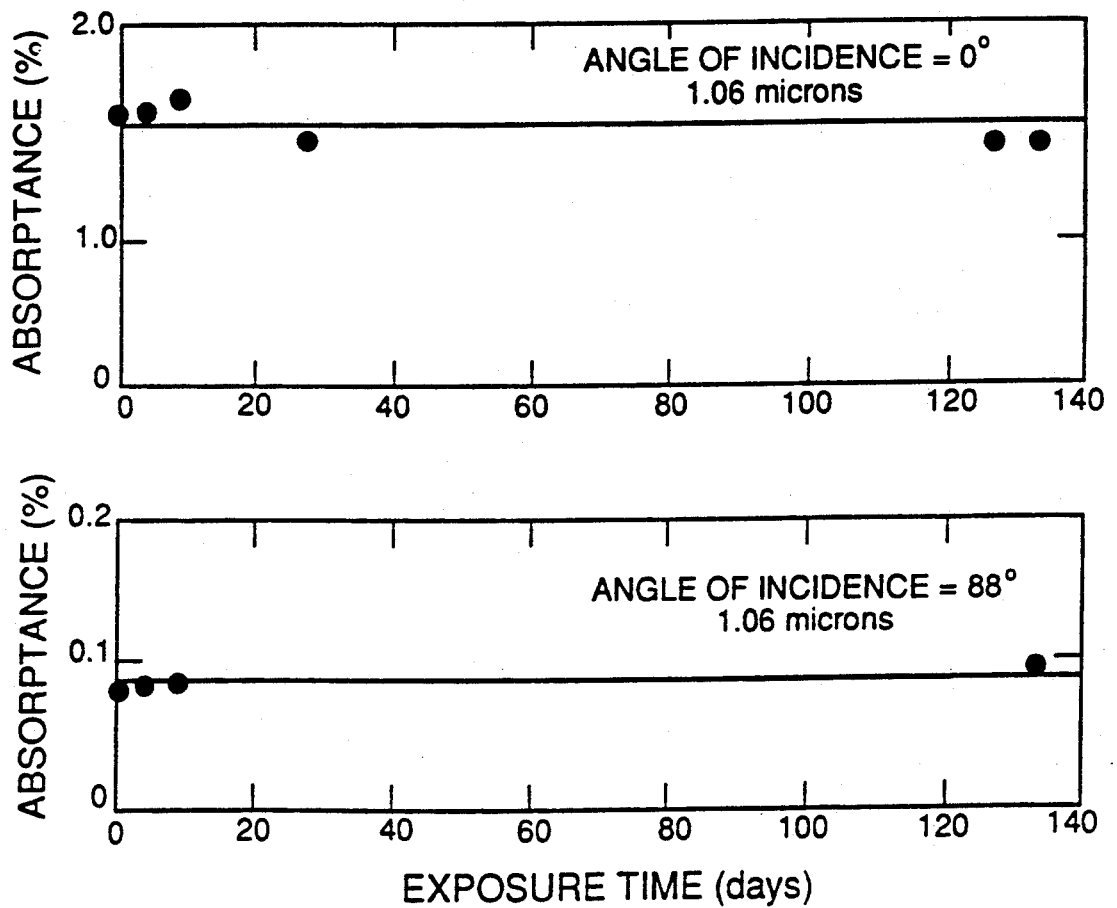
FIGS. 4, 5, and 6 show the results of absorptance testing on coated silver reflectors.

FIG. 4 shows absorptances of a test mirror coated in accordance with this invention at a wavelength of 1.06 microns at both 0° and 88° angle of incidence. There is little tarnishing evident after nearly 140 days of exposure.

Figure 5:
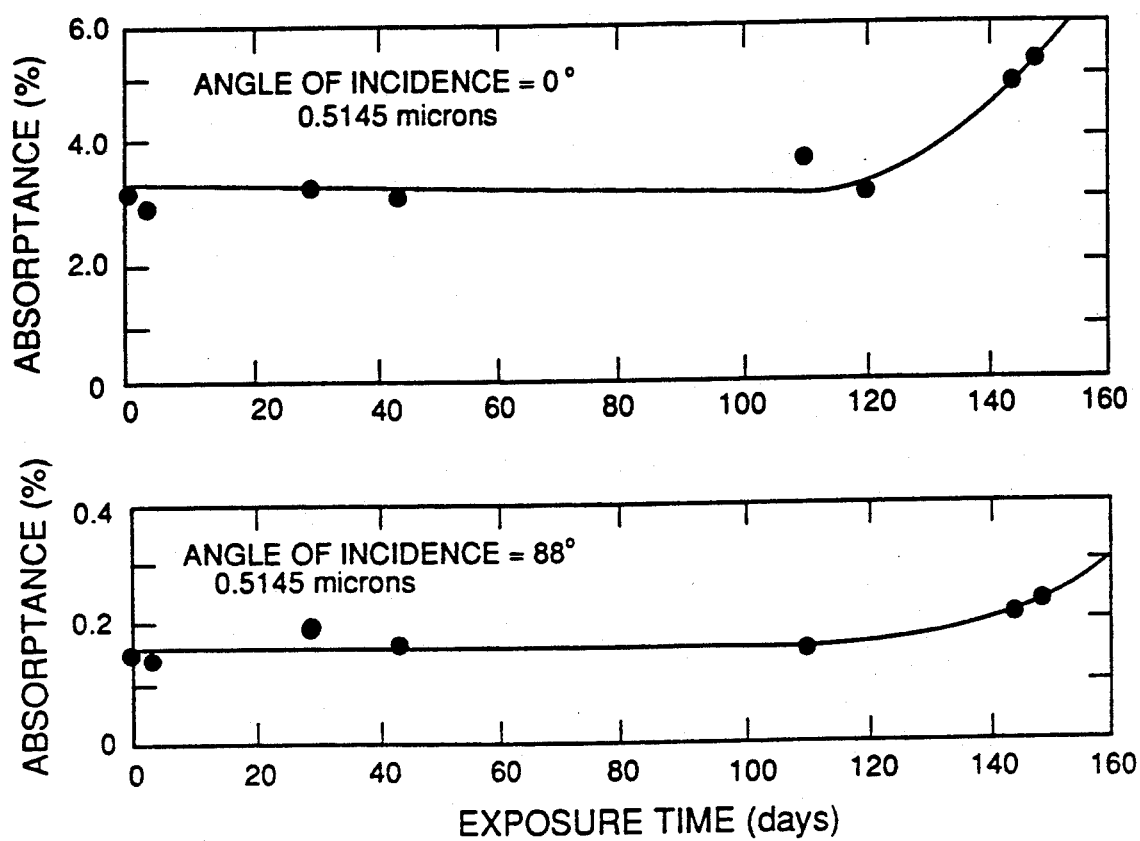

FIG. 5 shows test results for the mirror of FIG. 4 at 0.5145 micron wavelength. The effect of tarnishing is more evident at the shorter wavelength. Little tarnishing is evident until about 120 days. At 140 days the absorptances are significantly higher. Inspection of the surface with a high intensity microscope revealed a faint haze which is similar to that seen on a bare silver surface during the early stage of tarnishing. That the mirror of FIG. 5 shows signs of tarnishing after 120 days indicates that the overcoat does not permanently stop the onset of tarnishing. The onset of tarnishing is rather abrupt. A more gradual increase in absorptance might be expected if the overcoat were only partially protecting the surface. This seems to indicate that the overcoat does completely protect the surface, but that something changes after a period of time that stops this protection. What this might be is not known.

Figure 6:
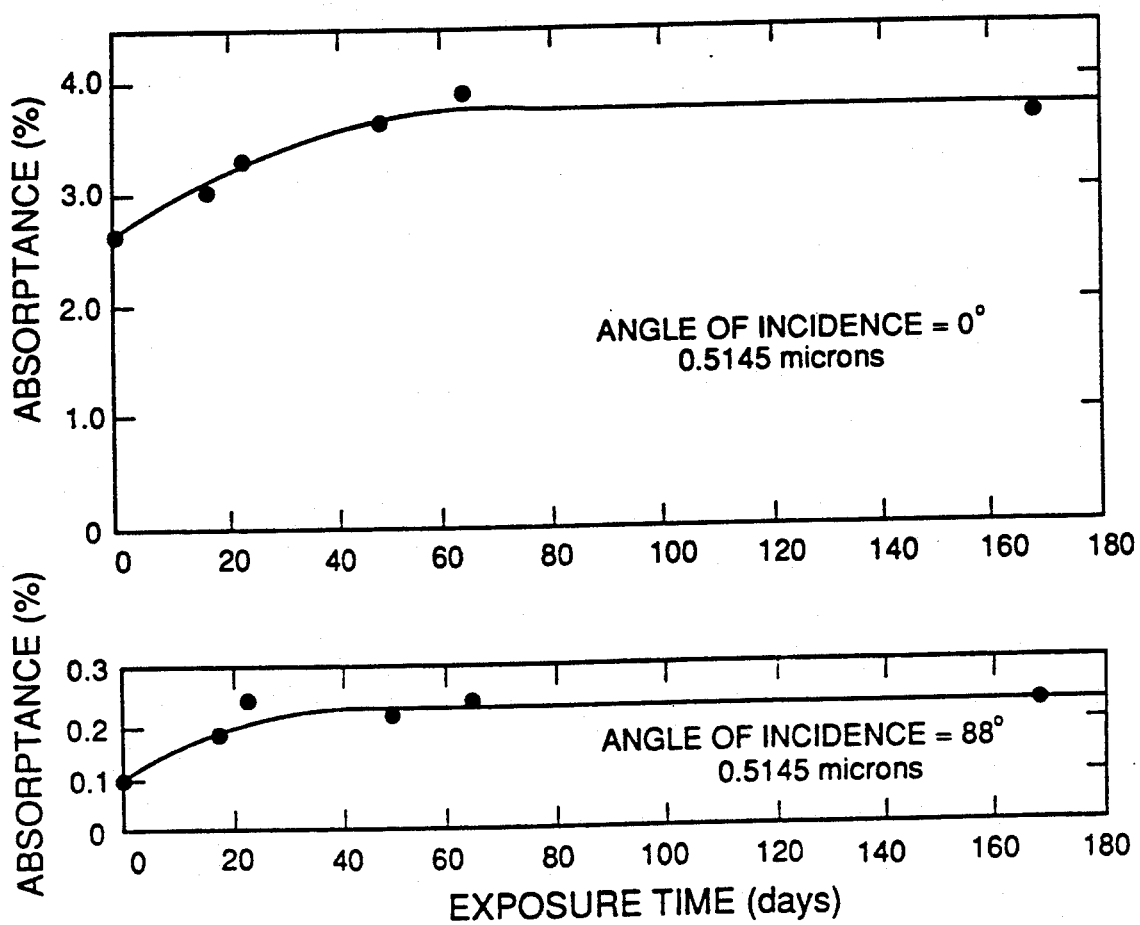

FIG. 6 shows test results upon exposure of a reflector to the atmosphere in the same room at the same time that the mirror of FIGS. 4 and 5 was exposed. The mirror of FIG. 6 was made in the same manner as the other test mirrors, but by a different person using a different electron beam vapor deposition system. The difference in tarnishing behavior as compared to the mirror of FIGS. 4 and 5 is puzzling. The increase in absorptance of the FIG. 6 mirror during its first 60 days of exposure shows that it was tarnishing. It is not clear why this apparent tarnishing stopped and the absorptance levelled off to a constant value. If it was truly tarnishing, one would expect the absorptance to increase in a manner similar to that seen with the bare silver mirror (see FIG. 3). More work is needed to fully understand the observed tarnishing behaviors.

The thickness of the coating on a reflector is determined by placing a quartz crystal mounted in a tunable resonator circuit in the vacuum chamber with the reflector while coating is accomplished, determining the resonant frequency of the crystal, and calculating the reflector coating thickness by means of a linear equation which relates reflector coating thickness to the resonant frequency of the coated crystal. The resonant frequency of the coated crystal varies from the frequency of the uncoated crystal in accordance with the mass of the coating. Coating thickness is, of course, related to coating mass.

Calibration data used to construct the linear equation are collected from calibration runs in which a witness part located in the position in the vacuum chamber of a reflector and the quartz crystal are coated. After a calibration run, the thickness of the coating on the witness part is measured by means of a stylus profilometer and resonant frequency of the coated crystal is measured, thus yielding a frequency versus thickness data point.

It is believed that, in addition to alumina, other transparent metal oxides may be used as the coating of this invention. Such metal oxides include the oxides of magnesium, titanium, silicon, yttrium, hafnium, zirconium, and praseodymium.

What is claimed is:

1. A method of protecting a silver reflector from damage caused by contact with gaseous substances comprising at least partially coating the reflector to a thickness of 15 Å or less with a substance selected from a group containing aluminum oxide, magnesium oxide, titanium dioxide, silicon dioxide, yttrium oxide, hafnium oxide, zirconium oxide, and praseodymium oxide.

2. A method of protecting a silver reflector from damage caused by contact with gaseous substances comprising at least partially coating the reflector with aluminum oxide to a thickness of 15 Å or less.

3. A silver reflector at least partially coated with a substance selected from a group containing aluminum oxide, magnesium oxide, titanium dioxide, silicon dioxide, yttrium oxide, hafnium oxide, zirconium oxide, and praseodymium oxide where said coating has a thickness of 15 Å or less.

4. A silver reflector at least partially coated with aluminum oxide where said coating has a thickness of 15 Å or less.

* * * * *